UNITED STATES PATENT OFFICE.

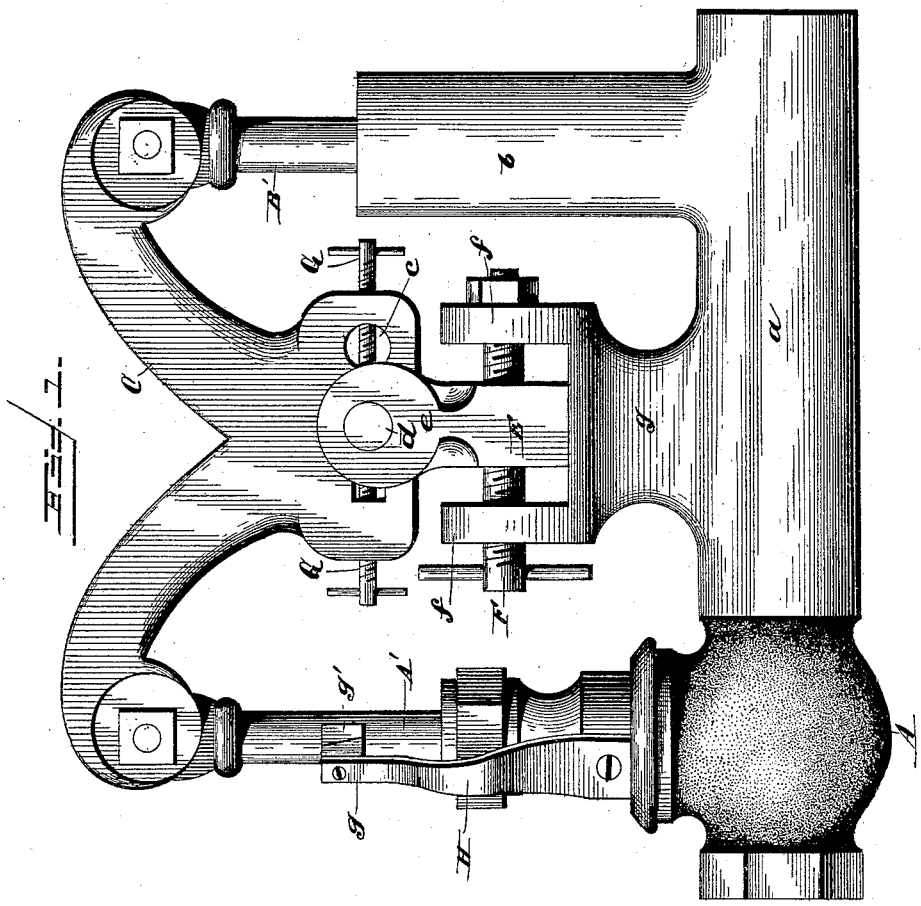

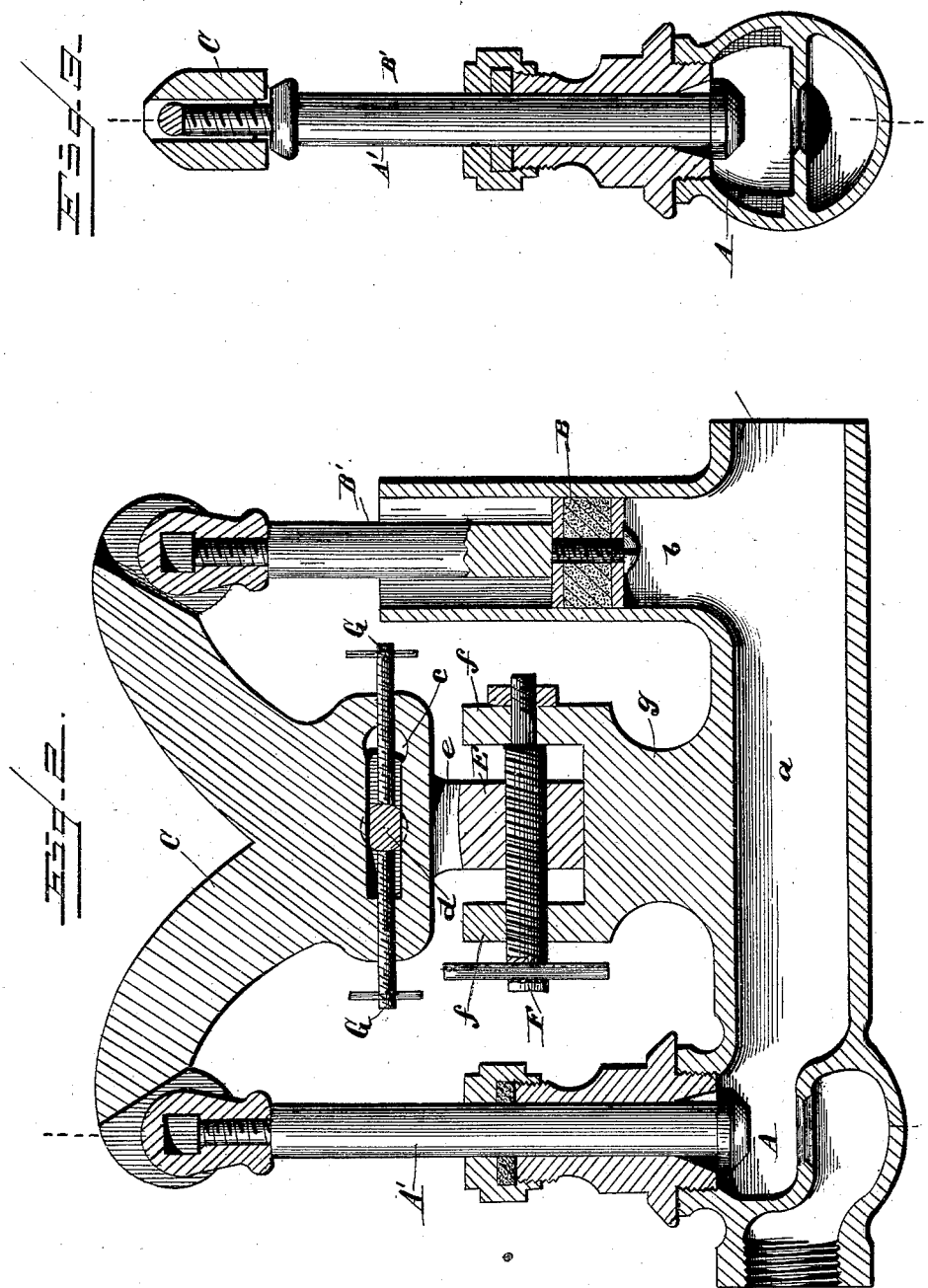

PETER D. CONNEELY, OF HORSEHEADS, NEW YORK.

REDUCTION-VALVE AND PRESSURE-REGULATOR.

SPECIFICATION forming part of Letters Patent No. 405,533, dated June 18, 1889.

Application filed February 9, 1889. Serial No. 299,233. (No model.)

*To all whom it may concern:*

Be it known that I, PETER D. CONNEELY, a citizen of the United States of America, residing at Horseheads, in the county of Chemung and State of New York, have invented certain new and useful Improvements in Conneely's Reduction-Valves and Pressure-Regulators, of which the following is a specification, reference being had therein to the accompanying drawings.

This invention relates to certain improvements in reduction-valves; and it consists of the novel combination of parts and their construction, as will fully appear from the following description and accompanying illustration.

Figure 1 is a side elevation of my improved reduction-valve; and Figs. 2 and 3 are a longitudinal and a central transverse section, respectively, of the same.

In the organization of my invention I employ a globe-valve A, seated in the steam, gas, or other pipe $a$, for conducting a fluid or liquid under pressure. Also applied to the pipe $a$ a suitable distance from the valve A is a pipe $b$, within which works a plunger B, whose face or area is greater than that of the valve A. The stem A' of the valve A and the rod B' of the plunger B are suitably connected to a walking-beam form of lever C, being applied to the ends of the latter. The lever or walking-beam C has a horizontal slot $c$ in its central pendent portion, which receives a cylindric pin or pivot $d$, resting in parallel apertured extensions or bearings $e$ $e$ of a casting or block E, and between which extensions or bearings is received the lower end of the pendent portion of the beam or lever C. The casting or block E is carried or supported upon a handled screw F, bearing in ears or lugs $f f$ of an upward extension $g$ of the pipe $a$, said casting or block resting at its lower end upon the upper flat surface of said extension. Also fitting or working in and through the end walls of the slot $c$ of the pendent portion of the lever or beam C are short-handled or lever screws G G, whose inner ends bear upon said pendent portion of the lever or beam.

The purpose of the adjusting or lever screw F is to vary the leverage of the plunger B through the movable block E and the slot $c$ of the lever C, the short-handled screws G G serving to prevent the involuntary sliding back and forth of the lever or beam upon its pivot or fulcrum where the latter passes through the slot.

Applied to the valve-stem packing or other suitable point is a spring-catch H, having a beveled or incline-faced projection $g$ at its upper end, which, when the valve is in operation, slides upon a corresponding beveled or faced projection $g'$ of the valve-stem. The primary object of this arrangement is to hold the valve closed or against operation when desired, in that event the walking-beam or lever C being forced down at the valve end thereof until the projection $g'$ upon the valve-stem is moved past or below the upper end projection $g$ of the spring H, the latter projection at that moment springing upward and above the projection $g'$ of the valve-stem, interlocking the same.

It will be observed that, the plunger, as above stated, having the greater area or pressure-surface, a less amount of pressure thereupon will cause the closing of the valve, and consequently effect the removal wholly of pressure from the plunger.

Having thus fully described my invention, what I claim, and desire to secure by Letters Patent, is—

1. The reduction-valve having its valve and plunger beam or lever provided with a slot which receives the pivot or fulcrum, and upon which pivot or fulcrum bear handle-screws working in said lever or beam, said pivot or fulcrum being carried by a block or slide, in turn carried by a lever-screw bearing in an extension of the pressure-pipe, substantially as and for the purpose set forth.

2. The reduction-valve having applied to its stem a beveled incline-faced projection, in combination with the spring-catch having at the upper end a similar projection engaging with the aforesaid projection, substantially as and for the purpose specified.

In testimony whereof I affix my signature in presence of two witnesses.

PETER D. CONNEELY.

Witnesses:
JAMES D. SHOOTS,
C. E. CARPENTER.